(12) United States Patent
Ober et al.

(10) Patent No.: US 8,995,630 B1
(45) Date of Patent: Mar. 31, 2015

(54) TELEPHONY AND APPLICATIONS COMMUNICATION IN A NON-MOBILE TELEPHONE SYSTEM

(75) Inventors: Scott M. Ober, Oakton, VA (US); Ravin Suri, Oakton, VA (US); Stephen J. Schmitt, Mears, MI (US)

(73) Assignee: Tulsa Holdings, LLC, San Jose, CA (US)

( * ) Notice: Subject to any disclaimer, the term of this patent is extended or adjusted under 35 U.S.C. 154(b) by 0 days.

(21) Appl. No.: 13/195,813

(22) Filed: Aug. 1, 2011

Related U.S. Application Data

(60) Provisional application No. 61/369,754, filed on Aug. 1, 2010.

(51) Int. Cl.
*H04M 11/00* (2006.01)
*H04L 29/06* (2006.01)

(52) U.S. Cl.
CPC ..................................... *H04L 69/18* (2013.01)
USPC ................. 379/110.01; 379/90.01; 379/93.17

(58) Field of Classification Search
USPC .......... 379/90.01, 93.01, 93.07, 93.09, 93.17, 379/93.19; 370/352
See application file for complete search history.

(56) References Cited

U.S. PATENT DOCUMENTS

| | | | |
|---|---|---|---|
| 5,029,183 A | 7/1991 | Tymes | |
| 5,084,877 A | 1/1992 | Netravali et al. | |
| 5,222,061 A | 6/1993 | Doshi et al. | |
| 5,327,554 A | 7/1994 | Palazzi, III et al. | |
| 5,444,718 A | 8/1995 | Ejzak et al. | |
| 5,465,401 A | 11/1995 | Thompson | |
| 5,546,382 A | 8/1996 | Fujino | |
| 5,564,070 A | 10/1996 | Want et al. | |
| 5,598,534 A | 1/1997 | Haas | |
| 5,664,091 A | 9/1997 | Keen | |
| 5,673,322 A | 9/1997 | Pepe et al. | |
| 5,790,536 A | 8/1998 | Mahany et al. | |
| 5,809,415 A | 9/1998 | Rossmann | |
| 5,831,664 A | 11/1998 | Wharton et al. | |
| 5,842,210 A | 11/1998 | Chen et al. | |
| 6,014,429 A | 1/2000 | LaPorta et al. | |
| 6,076,113 A | 6/2000 | Ramanathan et al. | |
| 6,112,323 A | 8/2000 | Meizlik et al. | |
| 6,239,798 B1 | 5/2001 | Ludolph et al. | |
| 6,289,362 B1 | 9/2001 | Van Der Meer | |
| 6,452,937 B1 | 9/2002 | Borkovic et al. | |
| 6,556,676 B1 | 4/2003 | Buchanan et al. | |
| 6,859,462 B1 | 2/2005 | Mahoney et al. | |
| 7,225,117 B1 | 5/2007 | Feldstein et al. | |
| 7,970,436 B1 | 6/2011 | Katzer et al. | |

(Continued)

FOREIGN PATENT DOCUMENTS

EP 2209259 A1 7/2010

*Primary Examiner* — Stella Woo
(74) *Attorney, Agent, or Firm* — Herbert T. Patty

(57) ABSTRACT

Technology is described for a non-mobile telephone system which in addition to processing voice signal data and performing telephone functions, can execute applications transferring data responsive to user input received through a graphical user interface of the telephone system. The non-mobile telephone includes a telephony processing system for performing telephone functions, and an applications processing system for executing applications. The two processing systems communicate using a communication protocol between them which is independent of a telecommunication protocol used for voice signal data processed by the telephony processing system.

8 Claims, 12 Drawing Sheets

(56) References Cited

U.S. PATENT DOCUMENTS

| | | |
|---|---|---|
| 8,302,094 B2 | 10/2012 | Rogel et al. |
| 2001/0050918 A1 | 12/2001 | Surprenant et al. |
| 2002/0165831 A1 | 11/2002 | Horn et al. |
| 2005/0069101 A1* | 3/2005 | Bear et al. ................. 379/90.01 |
| 2005/0138124 A1 | 6/2005 | Klassen et al. |
| 2005/0219068 A1 | 10/2005 | Jones et al. |
| 2005/0227216 A1 | 10/2005 | Gupta |
| 2006/0128306 A1 | 6/2006 | Jung et al. |
| 2006/0227950 A1 | 10/2006 | Mielich et al. |
| 2007/0055632 A1 | 3/2007 | Hogl |
| 2007/0168953 A1 | 7/2007 | Diez et al. |
| 2008/0005239 A1 | 1/2008 | Podl |
| 2008/0046832 A1 | 2/2008 | Balasubramanian |
| 2008/0084989 A1 | 4/2008 | Dhanakshirur |
| 2008/0090592 A1 | 4/2008 | Tsuchiya |
| 2008/0207185 A1 | 8/2008 | Paetsch |
| 2008/0212755 A1* | 9/2008 | Couse .................... 379/201.04 |
| 2009/0006256 A1 | 1/2009 | Lazovsky et al. |
| 2009/0135806 A1 | 5/2009 | Pulhug |
| 2009/0187854 A1 | 7/2009 | Murtagh |
| 2009/0254614 A1 | 10/2009 | Brush et al. |
| 2009/0307361 A1 | 12/2009 | Issa et al. |
| 2009/0327282 A1 | 12/2009 | Wittig et al. |
| 2010/0017482 A1 | 1/2010 | Piccinini et al. |
| 2010/0146115 A1 | 6/2010 | Bezos |
| 2010/0157990 A1* | 6/2010 | Krzyzanowski et al. ..... 370/352 |
| 2010/0241483 A1 | 9/2010 | Haynes et al. |
| 2010/0246824 A1 | 9/2010 | Xiao et al. |
| 2010/0274569 A1 | 10/2010 | Reudink |
| 2011/0075825 A1 | 3/2011 | Balasaygun |
| 2011/0126216 A1 | 5/2011 | Galicia et al. |
| 2011/0268105 A1* | 11/2011 | Weiser et al. ................. 370/352 |
| 2011/0312303 A1 | 12/2011 | Brush et al. |
| 2011/0314153 A1 | 12/2011 | Bathiche et al. |
| 2011/0314467 A1 | 12/2011 | Pearson |
| 2011/0320535 A1 | 12/2011 | Donaldson |

* cited by examiner

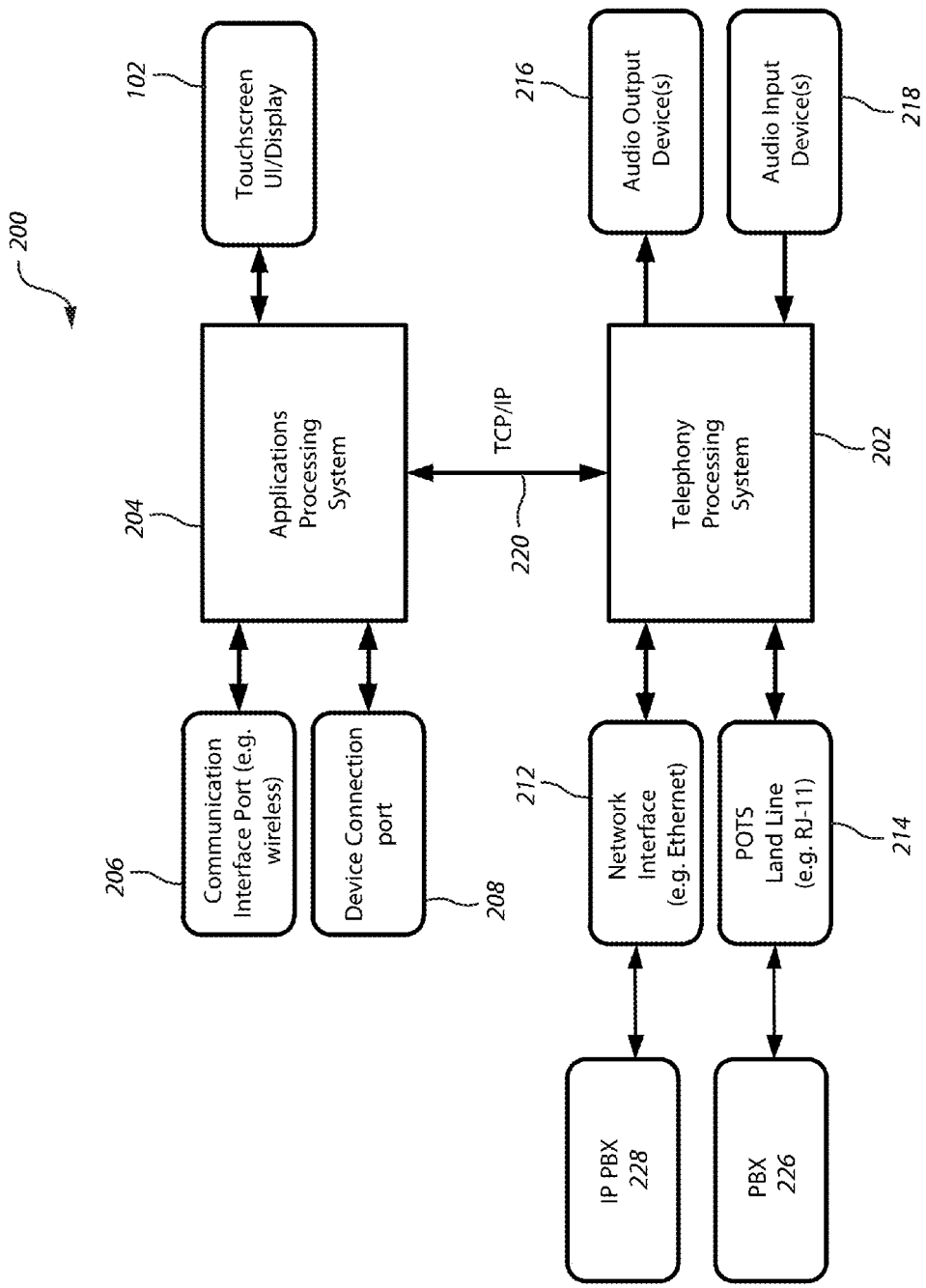

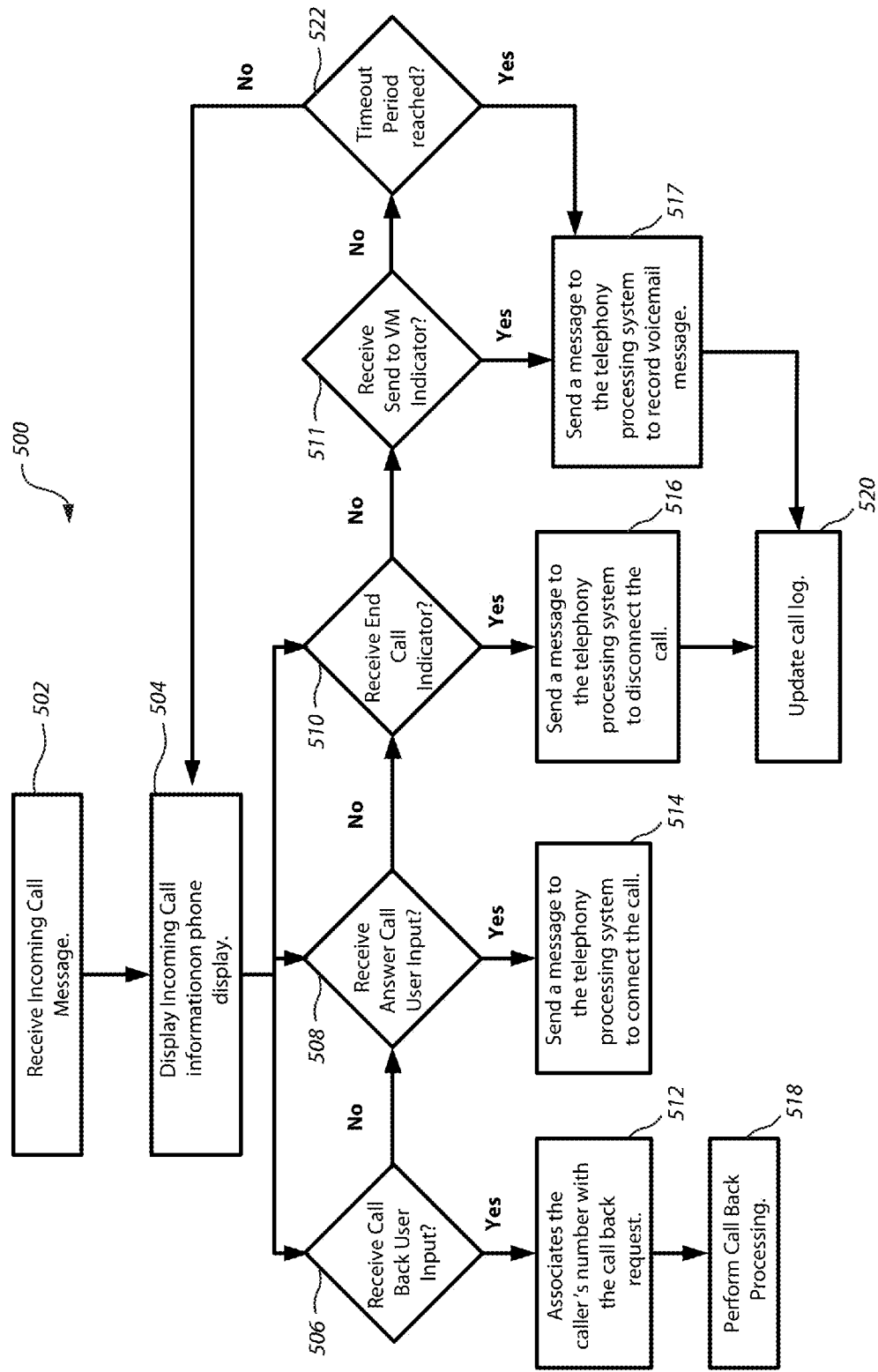

TELEPHONY AND APPLICATIONS COMMUNICATION IN A NON-MOBILE TELEPHONE SYSTEM

RELATED APPLICATION

The present application claims the benefit of priority under 35 U.S.C. 119(e) to U.S. Provisional Application Ser. No. 61/369,754, entitled "Telephony and Applications Communication in a Non-Mobile Telephone System" filed Aug. 1, 2010; 61/368,631 entitled "Transferring Data Between a Mobile Communication Device, a Non-Mobile Telephone System and a General Purpose Computer System," filed Jul. 28, 2010; 61/370,803, entitled "Pairing and Sharing Between a Non-Mobile Telephone System and a Computer System" filed Aug. 4, 2010; and 61/371,157, entitled "Call Features in a Non-Mobile Telephone System" filed Aug. 5, 2010, all of which are expressly incorporated by reference herein.

FIELD OF INVENTION

This invention relates generally to telecommunication systems, and more specifically to non-mobile telephone systems.

BACKGROUND

Mobile smartphones have many applications for the personal use of the user on the device itself. They have convenient small touchscreens but, keyboards can be quite small for entry of input with human fingers. Shortcuts in language which have developed due to the small keyboards on mobile communication devices may not be understood or appropriate in a business environment. These factors make the mobile telephone non-ideal for many business environments.

Non-mobile telephones, for example desktop or office phones, are still preferred by many in the office environment. For example, they have better speaker phone and sound quality.

However, the desktop or non-mobile telephone is still typically seen as a device solely for speaking to others remotely and is not viewed as an integral part of a company's computer network. The lack of integration between non-mobile telephones and computer networks may be caused by the various telecommunication protocols which carry calls.

SUMMARY

Technology is presented for a non-mobile telephone system comprising a telephony processing system for processing telephone functions and an applications processing system for executing applications for the non-mobile telephone system. The two processing systems communicate with each other using a communication protocol which is independent of any particular telecommunication protocol used for voice signal data processed by the telephony processing system.

In one embodiment, the non-mobile telephone system comprises a graphical user interface which provides visual displays to assist a user in processing telephone calls. In one example, using the independent communication protocol, the applications processing system communicates messages to the telephony processing system for executing telephone functions regardless of protocol for the voice signal data.

BRIEF DESCRIPTION OF THE DRAWINGS

FIG. 2 illustrates an embodiment of system architecture for a non-mobile telephone system.

FIG. 5A is a flowchart of a method embodiment for processing a call using an interprocessing system protocol independent of a particular telecommunications protocol.

DETAILED DESCRIPTION

Figure 1A:
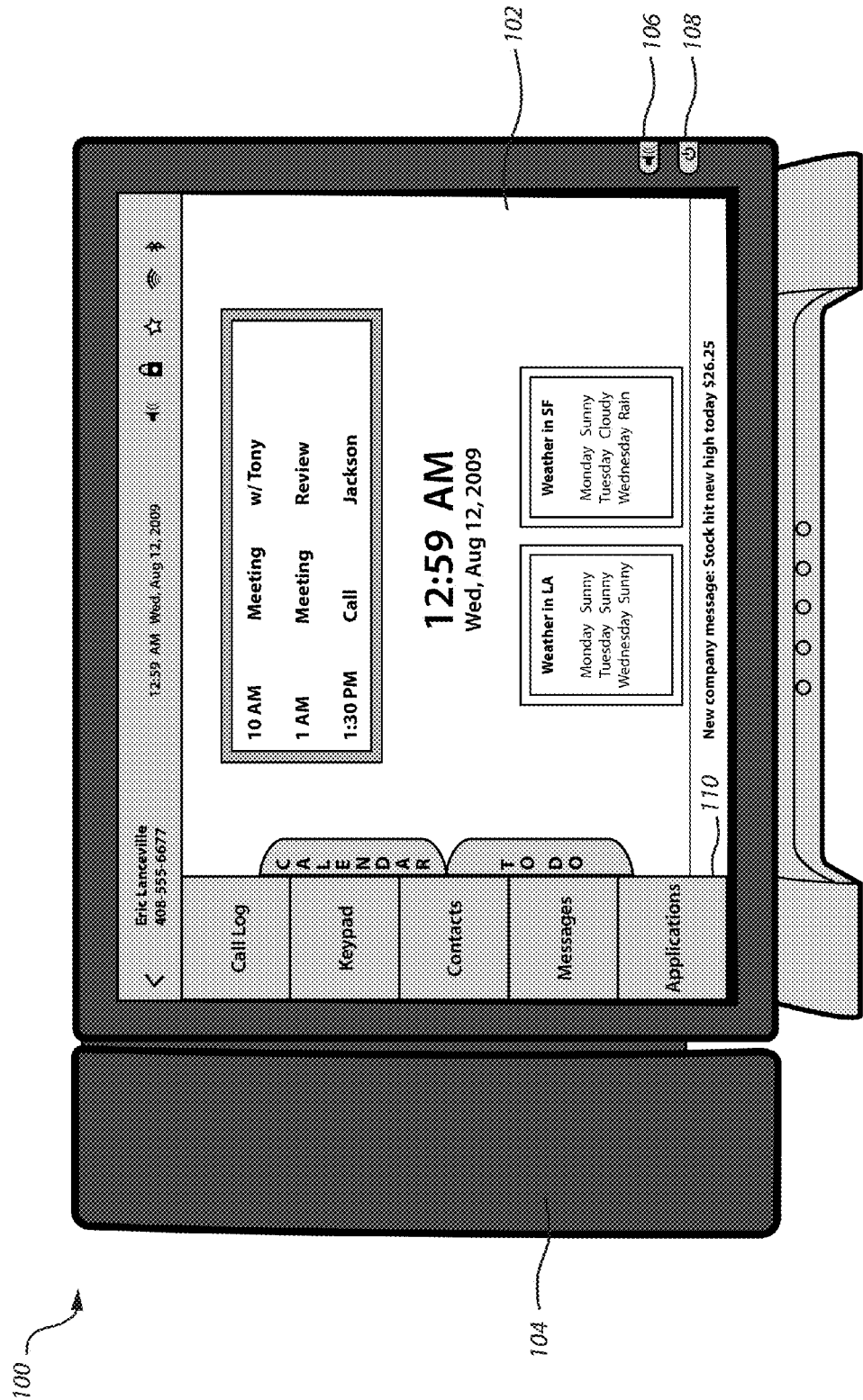
FIG. 1A illustrates an embodiment of a non-mobile telephone system with a user interface.

FIG. 1A illustrates an embodiment of a non-mobile telephone system 100 with a user interface 102. This illustrated embodiment is well-suited for use as a business or office desktop telephone. A non-mobile telephone system differs from a mobile communication device in a number of characteristics. For example, a non-mobile telephone is typically of a size that although it can be easily carried by a human from one desk to another like a desktop computer, can not easily fit in a purse or pocket for being constantly with a person like mobile communication devices such as cellular telephones, smart phones or personal digital assistants (PDAs). Non-mobile telephone systems such as desktop phones are adapted to be placed on, and possibly attached to, a supporting surface such as a table or wall, and to be operated while being supported by such a surface.

Furthermore, in some examples, a non-mobile telephone system can receive its voice signal data over a wired connection such as a Plain Old Telephone System (POTS) line or a Voice over Internet Protocol (VoIP) line connection and process the voice signal data in these protocols. For example, VoIP data representing voice signal data may connect to the Internet via a wired Ethernet connection port to the non-mobile telephone system.

In an embodiment, non-mobile telephone systems receive and process voice signal data in a wireless communication protocol such as a Global System for Mobile Communications (GSM) or other cellular based communications protocols. Furthermore, non-mobile telephone systems for business use typically are connected to a type of private business exchange (PBX), such as a traditional PBX or an Internet Protocol PBX (IP PBX) or a hosted or virtual IP PBX for VoIP. Fixed location telephones using a mobile cellular communication protocol like GSM can also be linked to a type of PBX (see FIG. 2).

In an embodiment as shown in FIG. 1, a non-mobile telephone system 100 comprises a handset 104 and a graphical user interface 102. As shown, user interface 102 includes a touchscreen. In an embodiment, the touchscreen is a color touchscreen of 800×600 16 bit color resolution. In the embodiment, the touchscreen is also eight inches across making it easy to manipulate with fingers or a handheld pointing device such as a pen for the touchscreen. In other embodiments, the telephone system can have an interface (not shown) for a pointing device such as a mouse and an interface (not shown) for a keyboard. In yet another embodiment where the non-mobile telephone system is paired with a general purpose computer system, pairing software allows a user to use a computer keyboard and mouse to update data for non-mobile telephone system 100.

Additionally, non-mobile telephone system 100 includes a "do not disturb" button 106 and an speaker phone button 108. Moreover, non-mobile telephone system 101 can use a Power over Ethernet or standard power adapter.

In an embodiment as shown in FIG. 1A, user interface 102 displays a side menu 110 including various feature selectors on the touchscreen display area of user interface 102 that a user can select with his finger or other pointing device. Examples of the feature selectors include a "Call "Log," a keypad for typing in numbers, a "Contacts" selector for accessing contact information for various people or businesses, a "Messages" selector for selecting voicemail and text messages, a "Calendar" selector, a "To Do" list selector and an "Applications" selector for accessing call features and other services provided by the non-mobile telephone system. Currently displayed is calendar information as illustrated by the example "Mtg with Tony, discussing . . . " at 10:00 A.M.

Figure 1B:
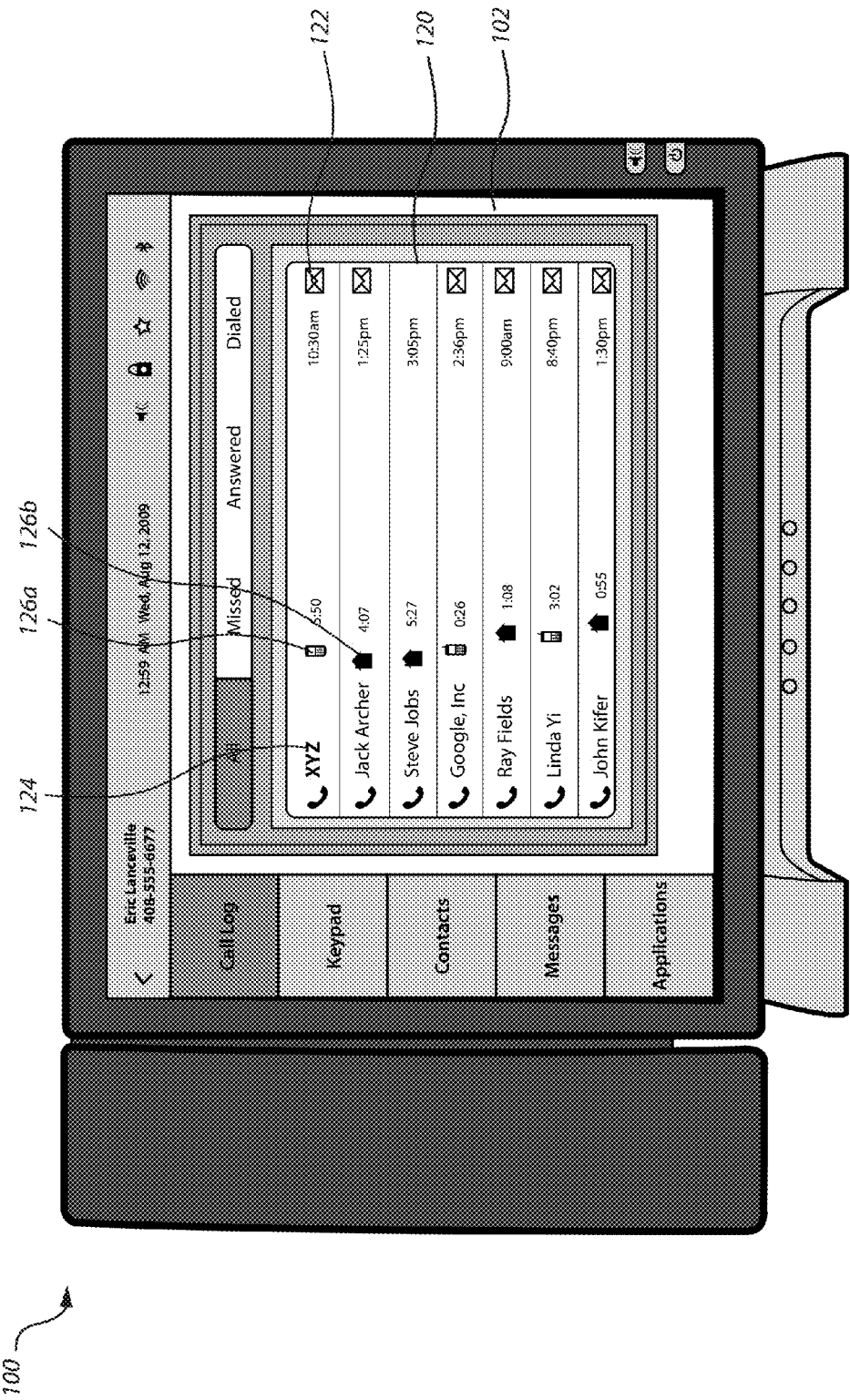
FIG. 1B illustrates another view of the embodiment of a non-mobile telephone system with a user interface illustrating a call log feature display.

Moving on to the next figure, FIG. 1B illustrates another view of the embodiment of a non-mobile telephone system 100 with a user interface 102 illustrating a call log feature display 120. In this call log display 120, the caller's information including an identifier 124 such as a name or number which is displayed along with an indicator of from which number or type of telephone, (e.g. mobile 126a or non-mobile 126b) the call was made. Additionally, a message indicator 122 is displayed for those calls for which a voicemail message was left. In some instances, the message may be a text message produced by speech to text software. In other instances, it can be a regular text message.

Figure 1C:
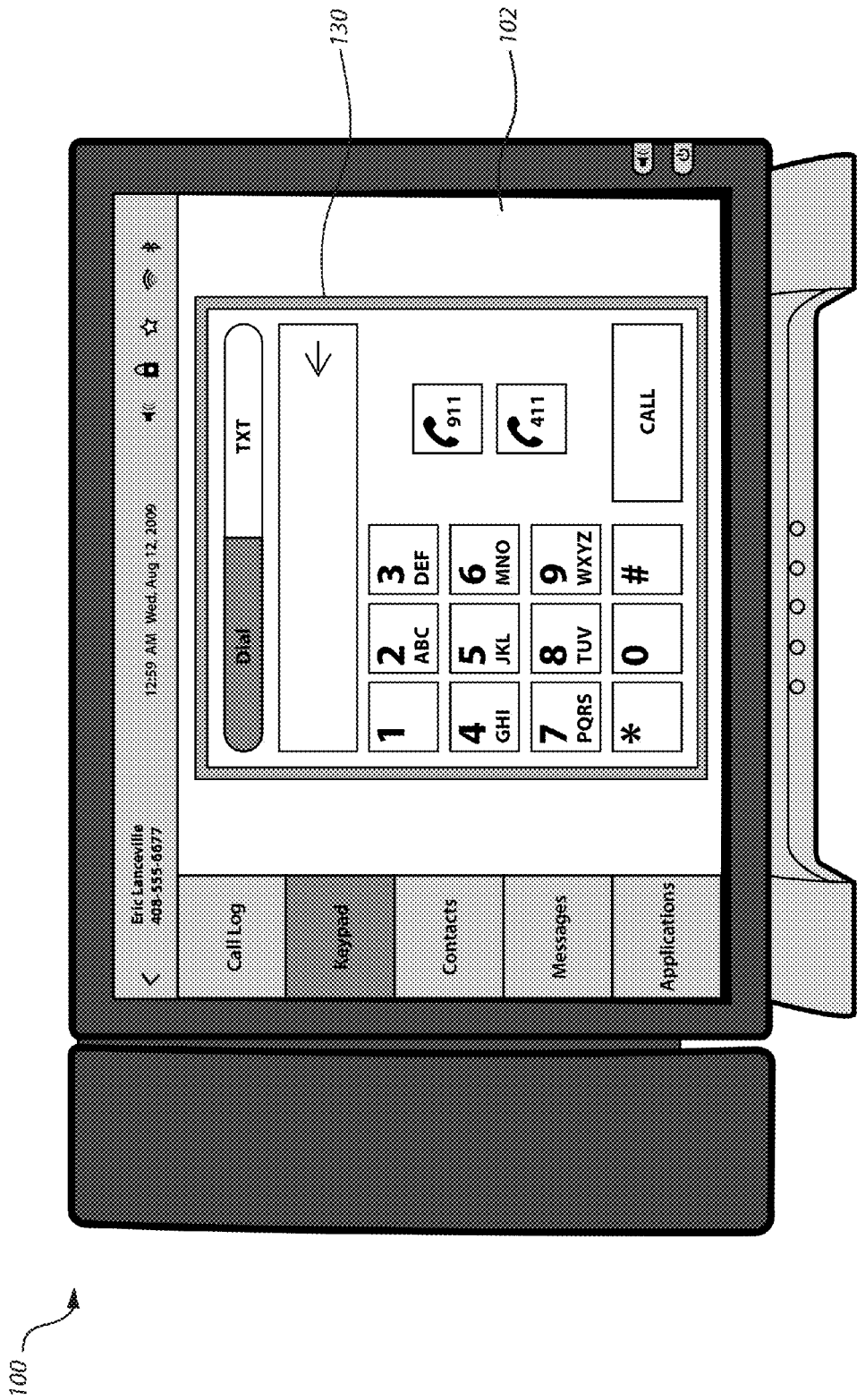
FIG. 1C illustrates another view of the embodiment of a non-mobile telephone system with a user interface illustrating a keypad.

FIG. 1C illustrates another view of the embodiment of a non-mobile telephone system 100 with a user interface 102 illustrating a keypad 130. In this example, a user can enter a number using the keypad and select the "Call" button to make the telephone dial the entered number. Additionally, "TXT" can be selected and a user can enter a text message using the keyboard of the office computer system via the pairing network (further described below). This text message is then transmitted to non-mobile telephone system 100, which can be used as an office phone, and subsequently transmitted to a mobile communication device (e.g. cell phone) via the cellular network of the mobile communication device.

Figure 1D:
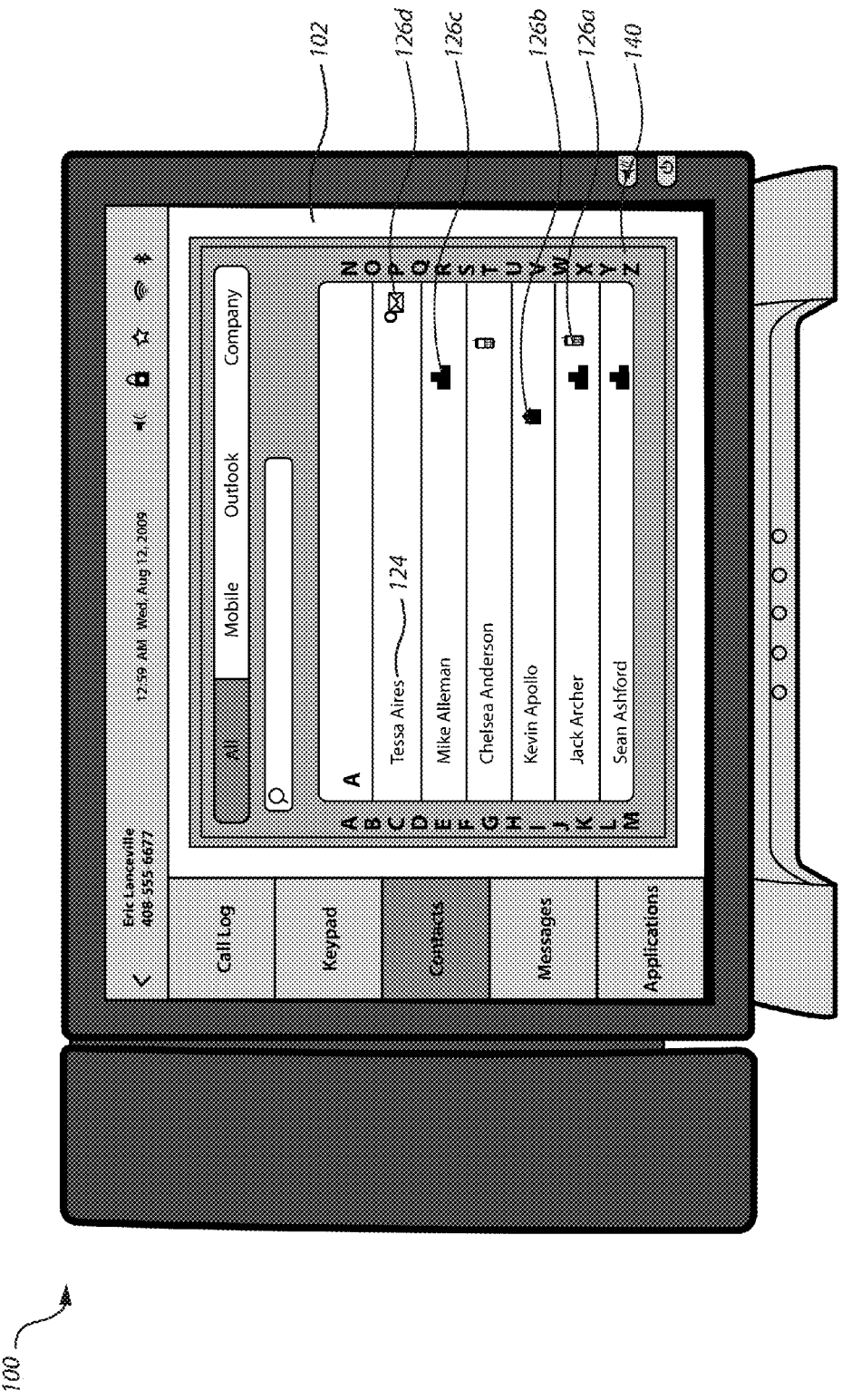
FIG. 1D illustrates another view of the embodiment of a non-mobile telephone system with a user interface illustrating a contacts feature.

FIG. 1D illustrates another view of the embodiment of a non-mobile telephone system 100 with a user interface 102 illustrating a contacts feature. In this contacts display 140, a contact's information including an identifier 124 such as a name or number is displayed along with an indicator of a telephone number and the type of telephone with which it is associated, (e.g. mobile 126a, home 126b, work or company 126c, or from a computer program such as Outlook® 126d).

As shown, contacts from a mobile communication device, an e-mail or other contacts collection type software (e.g. Outlook®), and from a company directory can all be integrated for viewing on a single display 140. They can also be listed by their individual categories. The non-mobile telephone system 100 can download the mobile communication device contacts using a wireless or wired connection, and can download the e-mail contacts and company directory via a local area network connection.

Figure 1E:
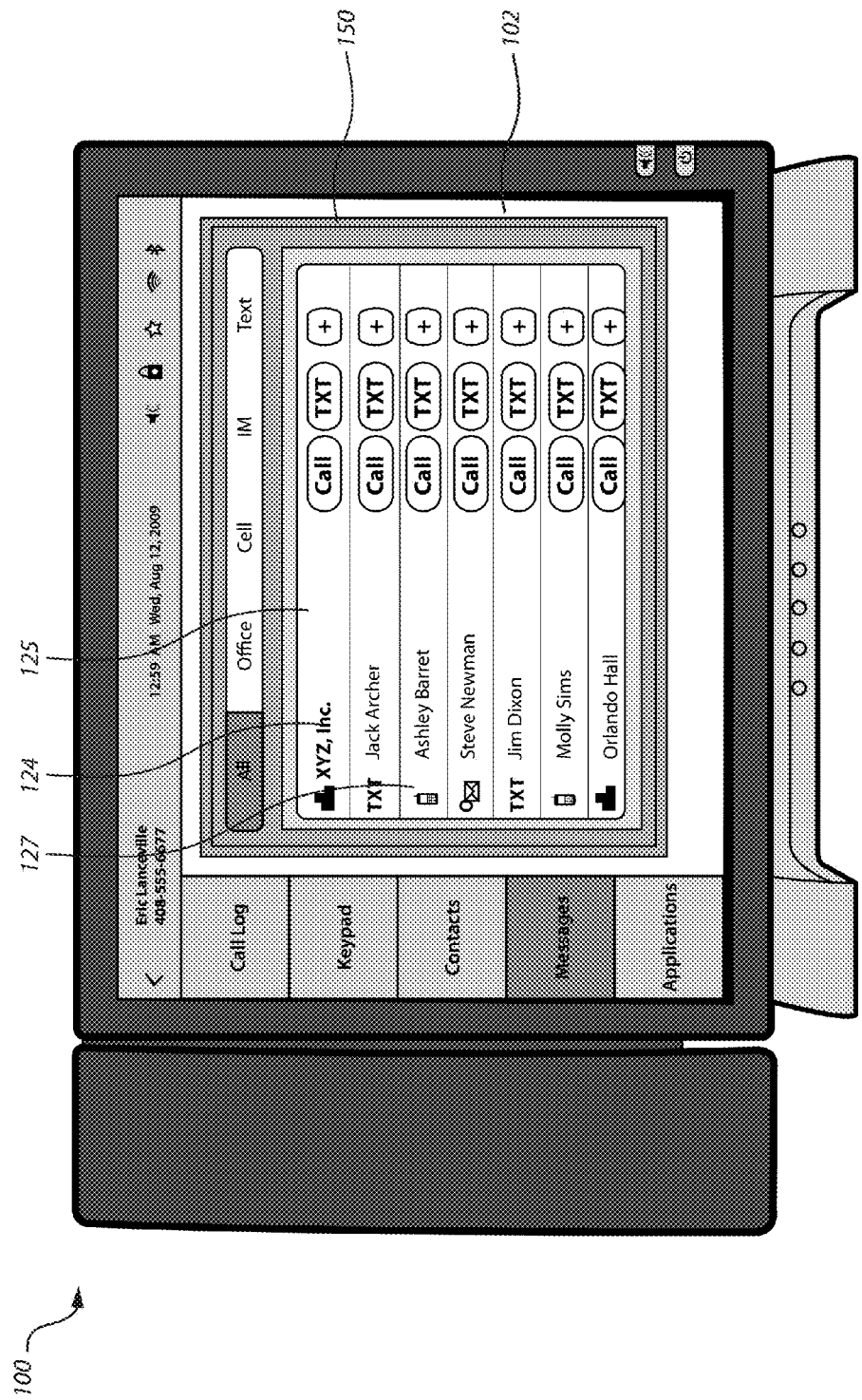
FIG. 1E illustrates another view of the embodiment of a non-mobile telephone system with a user interface illustrating a messages feature.

FIG. 1E illustrates another view of the embodiment of a non-mobile telephone system 100 with a user interface 102 illustrating a messages feature. In this messages display 150, as shown, messages, both voicemail and text from a mobile communication device, represented in "Cell", an instant messaging software application, represented in "IM", voicemail for this phone represented in "Office" and text messages for this telephone, represented in "TXT" can all be integrated for viewing on a single display 150. They can also be listed by their individual categories.

An identifier 124 such as a name or number with which the message is associated is displayed along with an indicator of the message category in this integrated view 150. For example, the symbol 125 next to "XYZ" indicates a voicemail message was left at the telephone number associated with this non-mobile telephone system. The "TXT" symbol next to "Jack Archer" indicates a text message for him. The symbol 127 which looks like a cellular phone next to "Mike Armann" indicates a voice or text message on the user's mobile telephone in communication with this non-mobile telephone system (further described below). The "IM" symbol next to "Lynda Barrett" indicates an instant messaging message from messaging software which can be executing on a paired computer system (further described below).

It should be understood by one having ordinary skill in the art that instant messaging is just an example and that the present invention should not be limited thereto. Other types of messages such as e-mail messages can be used as well. Also, voicemail messages can be represented as text using speech to text software if a user prefers as well. Messages can be any of incoming or outgoing messages or drafts and this would be in the spirit and scope of the present invention.

Additionally, a user can select a manner to respond such as but not limited to placing a call, sending a text message, or responding in another manner provided by the message categories which displays when the user selects the "+" display button for more options.

Figure 1F:
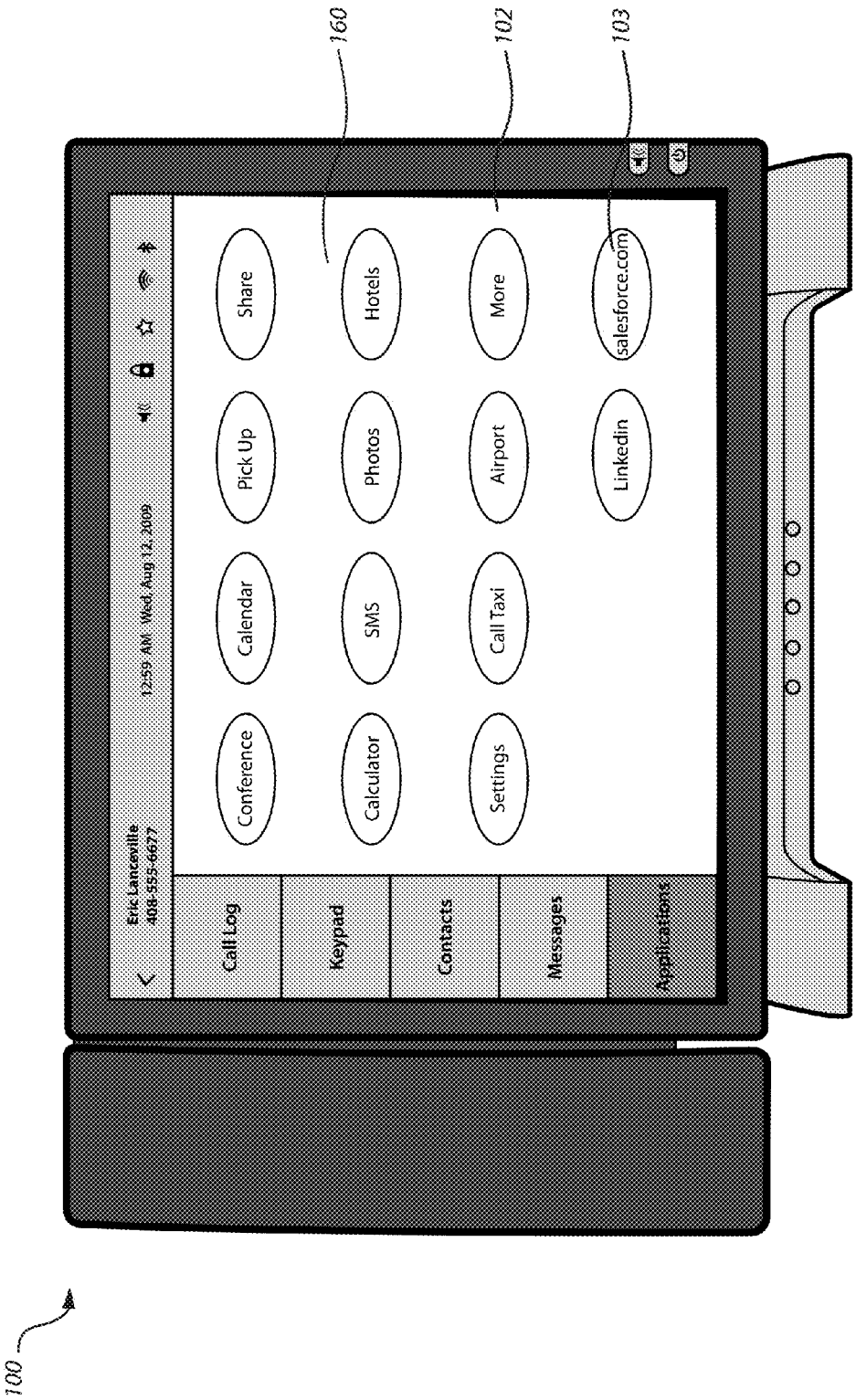
FIG. 1F illustrates another view of the embodiment of a non-mobile telephone system with a user interface illustrating an applications view.

FIG. 1F illustrates another view of the embodiment of a non-mobile telephone system 100 with a user interface 102 illustrating an applications view 160. A user selects a service, for example by touching, an application's selector or icon on the user interface display 102. Examples of different types of applications for services are represented by icons 103. For example, the "Conference" icon represents a kind of telephone service. The "Calendar", "Calculator" "Photos" and "Settings" represent computer services and device control services. "Linkedin.com" represents an Internet based social or business networking service. Facebook, Twitter and MySpace are other examples. "Call Taxi," "Hotels," "Airport," "FedEx PickUp," "UPS PickUp," and "Salesforce.com" represent examples of types of services, typically for business, that can be launched from non-mobile telephone system 100. In an embodiment, the icon "SMS", can be selected by the user, in this case to send or read a text message. Also, in this example of FIG. 1F, a sharing activity can be initiated by the non-mobile telephone system responsive to a user selecting the "Share" icon in the Applications view 160.

FIG. 2 illustrates an embodiment of a system architecture 200 for a non-mobile telephone system. In the embodiment shown, the system architecture 200 comprises a telephony processing system 202 for processing telephone calls and an applications processing system 204 for controlling a graphical user interface 102 and executing applications responsive to user input, some of which are illustrated in FIGS. 1A through 1F. In addition, non-mobile telephone system architecture 200 supports voice signal data in an analog POTS telecommunication protocol, Voice over Internet Protocol (VoIP), and other Internet based and all digital transmission based protocols. In yet other embodiments, telephony processing can support different telecommunication protocols for voice signal data. For example, as mentioned above, voice signal data can be embodied according to POTS standards, or in accordance with a cellular protocol like GSM or Code Division Multiple Access (CDMA), or in accordance with Voice over IP (VoIP) traveling over wide area networks (WANs) to a local area network (LAN) to which the telephony processing system 202 is connected via a Network Interface 212 such as an Ethernet connection.

In an embodiment, telephony processing is segregated from applications processing such that parallel execution efficiencies can be achieved. As such, according to an embodiment, each processing systems which is independent of a particular telecommunications protocol also allows the applications processing system 204 to be modular in design and interface with telephone systems of different telecommunications protocols.

Applications processing system 204 performs functions that are independent of the particular telecommunication protocol such as controlling user interface display 102, and communicating with devices, such as a computer system in a LAN through a device connection port 208.

Device connection port 208 may be any of a Universal Serial Bus (USB) port, or a communication interface port 206 such as a wireless port and this would be in the spirit and scope of the present invention. Furthermore, examples of wireless communications may be any if a Bluetooth, a Worldwide Interoperability for Microwave Access (WiMax), or a version in the IEEE 802 set of standards for wireless communication, examples of which are the 802.11 set and the 802.16 set and this would be in the spirit and scope of the present invention. Alternatively, the applications processing system 204 can have a wired network interface such as an Ethernet port. In an embodiment, applications processing system 204 communicates with other computers in a network via network interface 202 of telephony processing system 212 which is a dual-ported Ethernet connection. In addition, applications processing system 204 is communicatively coupled to a user interface 102 such as a touchscreen for receiving user input and displaying output to the user.

Telephony processing system 202 and applications processing system 204 are communicatively coupled by an internal network 220 such as Transmission Control Protocol over Internet Protocol (TCP/IP) as illustrated in FIG. 2. It should be understood that the present invention is not limited to using TCP/IP to couple telephony processing system 202 to applications processing system 204 but may also include Internet Protocol (IP), Transmission Control Protocol (TCP) or any internal network consistent with the present invention and this would be in the spirit and scope of the present invention.

In an embodiment, processing systems 202 and 204 communicate using a communication protocol which may be independent of the telecommunication protocol (e.g. POTS, VoIP, GSM) used by the telephony processing system to process voice signal data. For example, as described below, TCP sockets are used as the communication protocol through which processing systems 204 and 204 communicate.

In the embodiment shown in FIG. 2, the telephony processing system 202 includes a POTS land line port 214 such as a Registered Jack line (RJ-11 line) for receiving and sending voice signal data. In the embodiment, telephony processing system 202 has one or more audio output ports 216, communicatively coupled to receive an audio signal from audio input device(s) 218 for an audio output device, such as a speaker for a handset 104, a speaker phone, and a headset jack (e.g. RJ-11 or 2.5 mm).

Figure 3A:
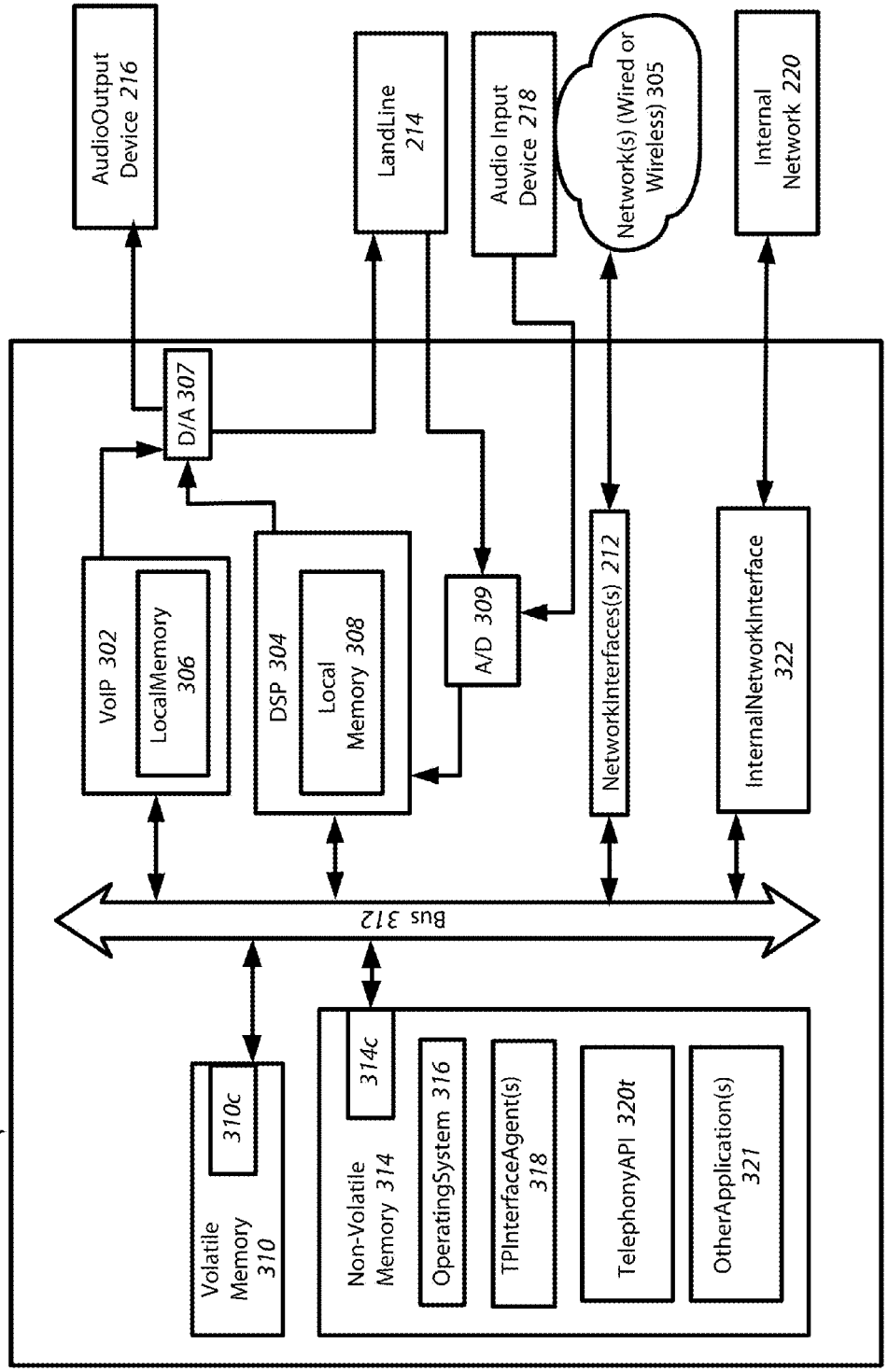
FIG. 3A illustrates an example embodiment of a telephony processing system including computer hardware and software components.

FIG. 3A illustrates a telephony processing system 202 including computer hardware and software components. As shown, telephony processing system 202 includes a VoIP processor 302 and a digital signal processing processor (DSP) 304 which enables voice signal data processing received digitally in VoIP packets in addition to analog signals received over a POTS line such as an RJ-11.

In an embodiment, telephony processing system 202 includes an Audiocodes® processing device which may include a VoIP and DSP Processor as well as voice codecs and supports a Session Initiation Protocol (SIP), an IETF-defined signaling protocol widely used for controlling multimedia communication sessions such as voice and video calls over Internet Protocol (IP). An example of such an Audiocodes® processor is the AC494.

Regarding the POTS voice signal data from POTS land line 214 received via the RJ-11 jack, analog to digital converter 309 is used to convert POTS voice signal data into digital form and subsequently sends the voice signal data to digital signal processor 304 (DSP 304) to extract and apply signal processing techniques to the voice signal data. For example, signal processing techniques may include any of echo cancelling and filtering and this would be in the spirit and scope of the present invention. The processed voice data from DSP 304 is converted from a digital to an analog signal, by a digital to analog converter 307, and subsequently outputted to an audio output port/device 216. Audio output device 216 may include any of a handset phone speaker, a headset, or a no-hands speaker phone option.

Voice signal data of a user is captured via an audio input device 218. For example, audio input device 281 may include any of the microphone of handset 104 (refer to FIG. 1) or a microphone for a speaker phone, can be converted from analog to digital form, and processed by (DSP) 304. For example, voice signal signal may also be filtered and compressed. In an embodiment, a digital signal processor within an Audiocodes processor, such as an AC494, runs voice codecs and echo canceling software. Subsequently, the digital signals are then converted back to analog form for transmission to POTS land line jack 214.

In the event that the voice signal data is transmitted over a VoIP network, digital signal processor 304 sends the processed voice digital signals to VoIP processor 302 via communication bus 312, and VoIP processor 302 formats the digital voice signals into VoIP packets which are forwarded to network interface(s) 212 for transmission over network 305, according to an embodiment. One or more network interface(s) 312 may communicate with one or more networks 305, including the Internet to receive and transmit data for computer system 202.

In an embodiment, telephony processing system 202 supports voice signal data in a VoIP telecommunication protocol. In an embodiment, a VoIP processor 302 receives VoIP packets from one or more network interfaces 212 of various networks 305 which are accessible by telephony processing system 202. Networks 305 may include wireless or wired networks. For example, an Ethernet cable can deliver the packets over a LAN to a non-mobile telephone system consistent with the present invention (e.g. non-mobile telephone system 100). The VoIP processor 302 extracts digital voice signal data from the packets and may also perform signal processing techniques such as decompression and filtering. The voice signal data is then converted to analog form for transmission to an audio output port 216.

In addition, FIG. 3A further shows that VoIP and DSP processors 302, 304 have local memories 306, 308 which can embody various cache designs to assist the processor(s) with the faster execution of instructions.

Bus 312 provides a communication path between the various system components. For example, bus 312 provides access to volatile memory 310 and non-volatile memory 314. In an embodiment, volatile memory 310 includes a memory controller 310c to enable reads and writes. In an embodiment, volatile memory 310 may include volatile storage such as random access memory (RAM) in its various technology implementations (DRAM, SRAM, etc.).

Non-volatile memory 314 includes a memory controller 314c which accessing may store software such as the operating system 316, a telephony application programming interface (API) 320t which supports an independent communication protocol associated with applications processing system 204, one or more telecommunication protocol (TP) interface agent(s) 318, and optionally other applications 321. The telephony application 320t processes messages including requests for telephone functions from applications processing system 204 in a telecommunications protocol independent format. When the telephony application 320t determines the request, the telephony application communicates the request to the appropriate TP interface agent(s) 318 which formats the request in a format usable by computer processing units such as software, firmware and/or hardware used for communicating in a particular telecommunication protocol such as POTS, VoIP, and GSM.

The aforementioned types of memory, both non-volatile and volatile, in addition to removable storage media (e.g. disks, memory sticks, etc.) are examples of computer-readable storage media having encoded thereon computer-executable instructions for performing various methods in accordance with embodiments of the technology described in this specification.

Figure 3B:
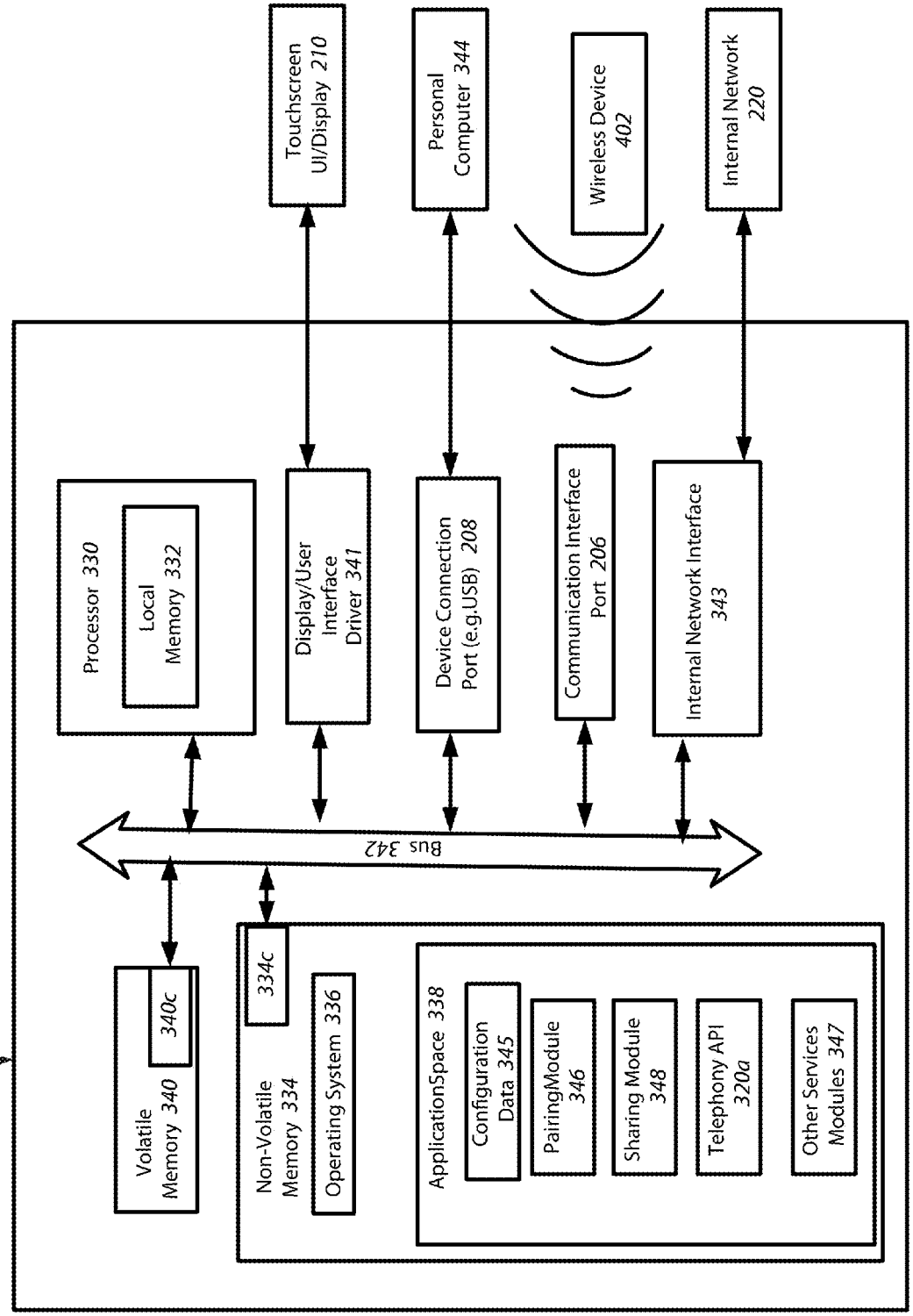
FIG. 3B illustrates an example embodiment of an applications processing system including computer hardware and software components.

In the embodiment shown in FIG. 3A, the various types of memory can store application code and associated data stores of telephony applications 320t and 320a (See FIG. 3B).

The VoIP processor 302 communicates with the applications processor 330 through an internal network interface 322 for the internal systems network 220 as they execute applications such as their respective versions 320t, 320a of the telephony application.

FIG. 3B illustrates an example embodiment of an applications processing system 204 including computer hardware and software components. As shown, applications processing system 204 includes a processor 330 with local memory 332 which can embody various cache designs to assist processor 330 execute instructions quickly.

In an embodiment, processor 330 includes an OMAP (Open Multimedia Application Platform) microprocessor, sold by Texas Instruments, which has capabilities for portable and mobile multimedia applications.

Bus 342 provides a communication path between the various system components. For example, bus 342 provides access to volatile memory 340 and non-volatile memory 334. Volatile memory 340 includes a memory controller 340c to enable reads and writes. Volatile memory 340 is representative of the volatile storage such as random access memory (RAM) in its various technology implementations (DRAM, SRAM, etc.).

Non-volatile memory system 334 includes a memory controller 334c for accessing the non-volatile memory which is representative of memory for storing applications such as the operating system 336 and other applications such as a telephony API 320a, a pairing module 346, sharing module 348, other services modules 347, and configuration data 345. These applications when executing are sometimes referred to as processing modules or applications.

Configuration data 345 includes identifying information about the non-mobile telephone system. For example, identifying information may include any of a telephone number, network address (e.g. an IP address), a media access control (MAC) layer address, a serial number, unique identifier separate from the telephone number, a packet identifying features it supports such as a display and touchscreen interface.

Default and preferred settings for the phone (e.g. volume level, display backgrounds, etc.) can also be stored in configuration data 345 which can be used to form a unique identification for use by pairing module 346 in pairing with another computer system. In an embodiment, configuration data 345 can additionally include information on other computer systems in a network or directly connected to a non-mobile telephone system consistent with the present invention (e.g. non-mobile telephone system 100 from FIG. 1) through a port with which the non-mobile telephone system can pair. Furthermore, configuration data 318 includes one or more encryption keys and passwords for security.

In the embodiment shown in FIG. 3B, applications processing system 204 further comprises a display and user interface driver 341 for the touchscreen user interface 210. In other embodiments, an I/O controller handles input from user input devices such as a keyboard or pointing device (e.g. mouse) and a display driver.

Furthermore, FIG. 3B illustrates a device connection port 208 such as a USB port for attaching to another computing device. Examples of wireless communication protocols that can be used are Bluetooth, WiMax or other IEEE 802 varieties of wireless protocols.

Moreover, applications processor system 330 communicates with the VoIP processor 302 through an internal network interface 220a for the internal systems network 220 as they execute applications such as their respective telephony applications 320t and 320a (FIG. 3A).

The telephony API 320a processes requests for telephone functions indicated by user input from the user interface 102 (e.g. touchscreen). In an embodiment, a telephone function is related to some aspect of processing a voice data signal in a live or active telephone call such as directing the connectivity of the live or active telephone call. Examples of telephone functions may include any of accepting an incoming call, placing a call on hold, hanging up a call, joining a conference call, and sending a call to voicemail. Telephony API 320a communicates requests for telephone functions to an API of a counterpart telephony application 320t on telephony processing system 202. As such, applications processing system 204 can interact with computers in a network (e.g. the LAN) and control telephone functions such as telephone functions for analog POTS based calls. As mentioned above, the APIs are configured to use a protocol for the requests that is not dependent on the telecommunication protocol for a call, such as POTS or VoIP.

Figure 4:
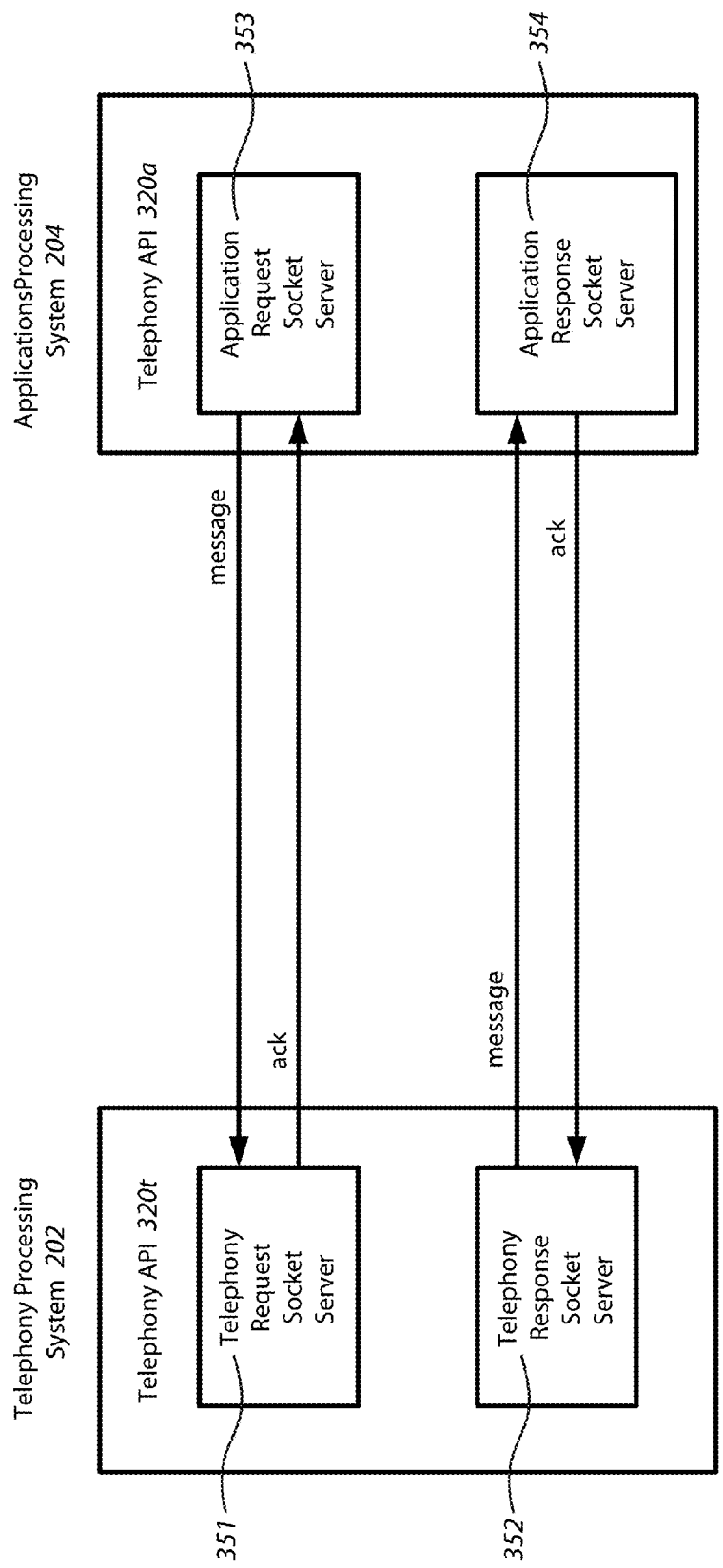
FIG. 4 illustrates an example of a communication protocol used between the telephony processing system and the applications processing system.

Moving through the figures, FIG. 4 illustrates an embodiment of a communication protocol used by telephony processing system 202 and applications processing system 204 to send and receive messages, including acknowledgments ("ack") to each other. In the embodiment shown, the API of each telephone application counterpart 320a and 320t, instantiates two TCP socket servers when it loads or starts up. Telephony API 320t instantiates a first socket server, referred to as Telephony Request Socket Server 351, to listen out for messages on a port from a socket server of applications processing system 204, referred to as Application Request Socket Server 352. Telephony Request Socket Server 351 sends an acknowledgement indicating the validity of a request message back to the Application Request Socket Server 353 which listens on a port for the acknowledgement.

Telephony API 320t instantiates a second socket server referred to as Telephony Response Socket Server 352 which sends a message when a request has been completed to a socket server of applications processing system 204 referred to as Application Response Socket Server 354. Application Response Socket Server 354 sends an acknowledgement which can indicate validity upon receipt of the response message to Telephone Response Socket Server 352.

In an embodiment, a message initiated on the telephony processing system 202 side, such as a message indicating an incoming call is sent by Telephony Response Socket Server 352 to the Application Response Socket Server 354 which may send an acknowledgement indicating the validity of the message in return simplifies processing in an asymmetrical message flow. For example, in an embodiment, the application system handling the graphical user interface 102 generates most of the messages.

In another embodiment, Application Response Socket Server 354 sends a response message for a request message Application Request Socket Server 353 received, such as a response message about a command for an incoming call to which Telephony Response Socket Server 352 sends an acknowledgement indicating validity of the response message.

In other embodiments, different numbers of server sockets can be used as well as client server socket configurations. Additionally, sockets for other protocols can be used. An example of such a protocol is UDP, Uniform Data Protocol.

A message format can include a variety of parameters depending on the telephone service requested. Some examples of parameters include a request identification (ID), a call identification, a telephone number, a type of function or command indicator such as an enumerated type or string. For example, a message requesting acceptance of an incoming call can include the request ID, a call ID, and an enumerated type or string of Request_Accept. For a request to join a conference, additional parameters may be another call ID representing the conference telephone number or conference call and a string such as "JOIN." In another example, a message requesting to hang-up a call can include the request ID, the call ID, and a command indicating hang-up. Similar parameters can be used for a request to hold a call.

Examples of message formats can be any of a series of integers, a character string, an array of characters, an array of integers, or an XML message format and this would be in the spirit and scope of the present invention. The message format is independent of the specific telecommunication protocol of the call.

Telephony Request Socket Server 351 parses the message using a table of parameters and logic for traversing the parameters to determine if its parameters indicate a valid message type and sends an acknowledgement to Application Request Socket Server 353 indicating the validity of the request message.

If the request message is valid, Telephony Request Socket Server forwards the request to a TP (telephone) interface agent 318 (FIG. 3A) responsible for processing the type of request to be in a form for processing by the computer processing units which process the call in the specific telecommunication protocol for the call.

Figure 5B:
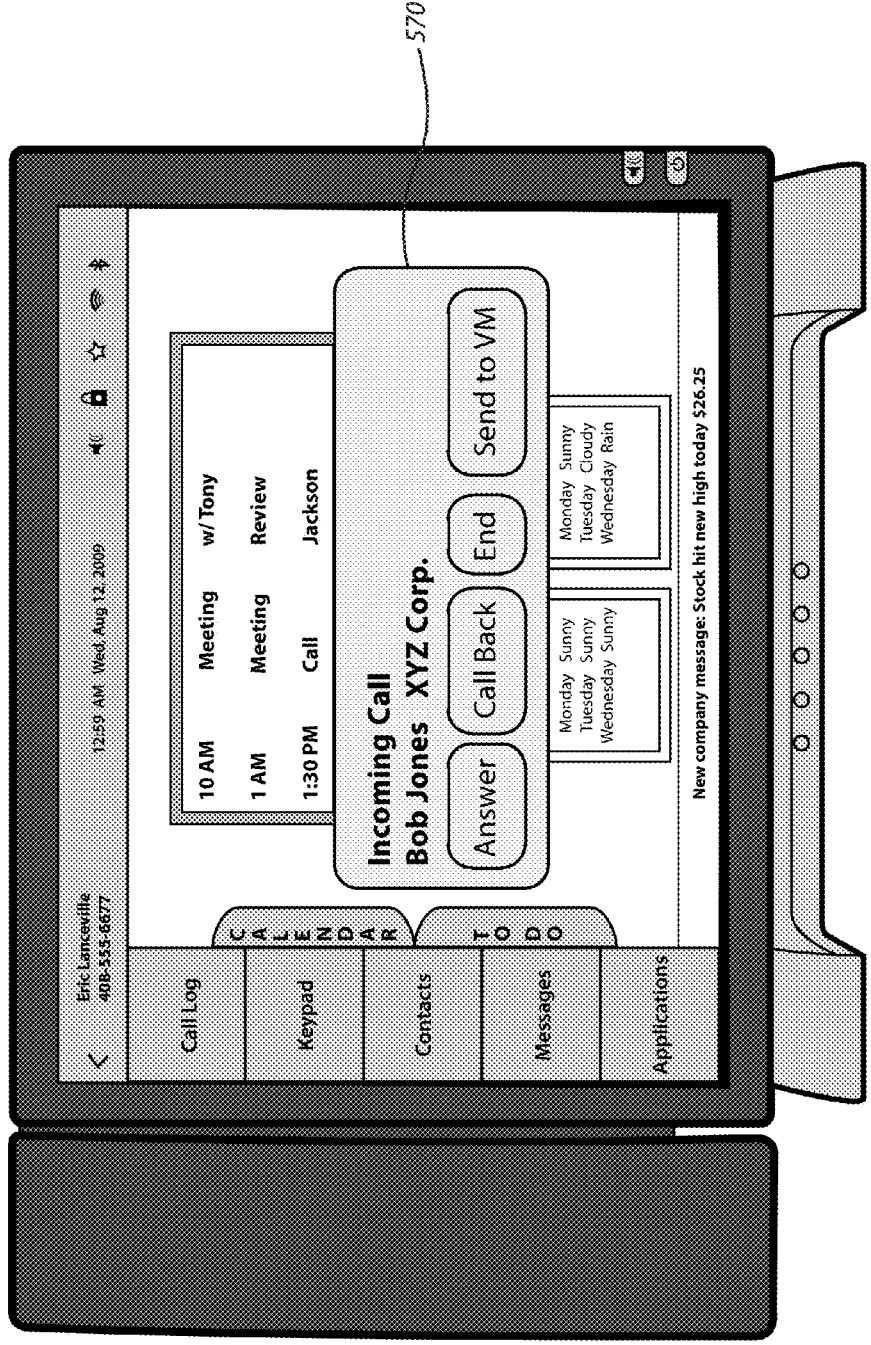
FIG. 5B is an example of a user interface display box requesting input from a user on how to process a call.

FIG. 5A illustrates a flowchart 500 of a method embodiment for processing a call using an interprocessing system protocol independent of a particular telecommunications protocol. The method embodiment of FIG. 5A is discussed in the context of the user interface display box of FIG. 5B, the independent interprocessing system protocol of FIG. 4, the processing systems of FIGS. 3A and 3B, and the non-mobile telephone system of FIGS. 1A-1F for illustrative purposes only and is not to be limiting thereof.

While executing the telephony application 320a, in this embodiment, the Application Response Socket Server 354 of the Telephony API 320a receives an incoming call message in accordance with block 502, and responds with an acknowledgement to Telephony Response Socket Server 352. Responsive to the incoming call, the telephony application 320a causes incoming call information (570 in FIG. 5B) to be displayed on the user interface 102 of the non-mobile telephone system 100 via the user interface driver 341, in accordance with block 504. As illustrated in FIG. 5B, a user can select from a number of options to process the call. For example, the user can select the "call back" display area, an "answer" display area, "send to VM," and an "end call" display area.

Responsive to a user selecting the "call back" display area, according to block 506, telephony application 320a associates the caller's number with the call back request as shown by block 512, and performs call back processing as shown by block 518. In addition, a caller being on hold for a certain period of time may trigger the call back function.

Telephony application 320a sends via the Application Request Socket Server 353 to the Telephony Request Socket Server 351 a message including a "Call Back" command which the telephony application 320t and TP interface agent 318 process to cause a voice response to be sent to the telephone of the caller indicating the callee (the user) will call the caller back, and causes the call to be terminated or ended. Telephony API 320a or a call back application 347 places the caller's call information in a call back queue which it stores in memory 340 and/or 334 for later retrieval.

Responsive to receiving user input to answer the call by the user selecting the "Answer" display button according to block 508, telephony API 320a executing on the application processor 330 sends a message via the Application Request Socket Server 353 to the listening Telephony Request Socket Server 351 of telephony processing system 202 to connect the call, according to block 514. Telephony Request Socket Server 351 sends an acknowledgement indicating validity. The user input to answer the call can be selection of the "Answer" display area or picking up the handset or selecting a speaker phone button if not already on another call. Responsive to telephony processing system 202 connecting the call, Telephony Response Socket Server 352 sends a message to the Application Response Socket Server which sends an acknowledgment back.

Responsive to receiving user input to end the call by the user selecting the "End" display button according to block 510, applications system processor 330 executes instructions of telephony API 320a to send a message via Application Request Socket Server 353 to the listening Telephony Request Socket Server 351 of telephony processing system 202 to end the call according to block 516. After the telephony processing system 202 ends the call, telephony API 320t causes Telephony Response Socket Server 352 to send a response message that the call has been ended to the Application Response Socket Server 354 which sends an acknowledgement. Telephony API 320a or a specific call log service module 347 updates the call log according to block 520.

Responsive to receiving user input to send the call to voicemail by the user selecting the "Send to VM" display button according to block 511, applications system processor 330 executes instructions of the telephony application 320a to send a message (block 517) via Application Request Socket Server 353 to the listening Telephony Request Socket Server 351 requesting the telephony processing system 202 to record a voicemail message. After telephony processing system 202 records the voicemail message and ends the call, telephony API 320t causes Telephony Response Socket Server 352 to send a response message that the message has been recorded and the call has been ended to Application Response Socket Server 354 which sends an acknowledgement. The telephony application 320a or a specific call log service module 347 updates (block 520) the call log.

The present invention may be embodied in other specific forms without departing from the spirit or essential characteristics thereof. Likewise, the particular naming and division of modules, routines, applications, features, attributes, methodologies and other aspects are not mandatory, and the mechanisms that implement the technology or its features may have different names, divisions and/or formats. Furthermore, as will be apparent to one of ordinary skill in the relevant art, the modules, applications, routines, features, attributes, methodologies and other aspects of the embodiments disclosed can be implemented as software, hardware, firmware or any combination of the three. Of course, wherever a component, an example of which is an application, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of programming.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In a non-mobile telephone system that includes a landline telephone, the non-mobile telephone system including a telephony processing system for performing telephone functions and an applications processing system for executing applications for the non-mobile telephone system, a method of interprocessing system communication comprising:
sending a message, by making a selection on a touchscreen display on the landline telephone, from the applications processing system to the telephony processing system in a format that is independent of a telecommunications protocol;
wherein making the selection on the touchscreen display includes displaying an applications view on the touchscreen display based on the selection made;
the telephony processing system receiving the message; and, responsive to the message, performing instructions in the telecommunications protocol processed by the telephony processing system;
wherein instructions in the telecommunications protocol processed by the telephony processing system are capable of sending an instant message request, sending a text message, and making a voice call according to the message.

2. The method of claim 1 further comprising the applications processing system receiving data from the telephony processing system in a format which is independent of a telecommunications protocol.

3. The method of claim 2, wherein the applications processing system and the telephony processing system send messages using socket based communications processing system and the telephony processing system send messages using socket based communication.

4. The method of claim 3, wherein the message is sent over a communication coupling between the processing systems using Transmission Control Protocol (TCP).

5. The method of claim 2, wherein the applications processing system sends the telephony processing system a command in the message requesting a telephone function be performed.

6. The method of claim 5, wherein the telecommunication protocol is a POTS protocol.

7. The method of claim 4, wherein the applications processing system executes a user interface application for displaying output to a user and receiving input from a user.

8. A non-transitory computer readable medium storing computer readable instructions for machine execution of a method for: in a non-mobile telephone system that includes a landline telephone, the non-mobile telephone including a telephony processing system for processing voice signal data and an applications processing system for executing applications for the non-mobile telephone system, one or more computer-readable storage media comprising instructions encoded thereon for causing a processing system to execute a method for interprocessing system communication, the method comprising:
sending a message, by making a selection on a touchscreen display on the landline telephone, from the applications processing system to the telephony processing system in a format that is independent of a telecommunications protocol;
wherein making the selection on the touchscreen display includes displaying an applications view on the touchscreen display based on the selection made;
the telephony processing system receiving the message; and, responsive to the message, performing instructions on data in the telecommunications protocol processed by the telephony processing system;
wherein instructions in the telecommunications protocol processed by the telephony processing system are capable of sending an instant message request, sending a text message, and making a voice call according to the message; and
the applications processing system receiving data from the telephony processing system in a format which is independent of a telecommunications protocol.

* * * * *